(12) United States Patent
Sharifi Mehr

(10) Patent No.: US 11,842,224 B1
(45) Date of Patent: Dec. 12, 2023

(54) SYNCHRONOUS AND ASYNCHRONOUS RESPONSES TO DATA REQUESTS FROM REMOTE DEVICES

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 619 days.

(21) Appl. No.: 15/694,151

(22) Filed: Sep. 1, 2017

(51) Int. Cl.
*G06F 9/50* (2006.01)
*G06F 9/48* (2006.01)

(52) U.S. Cl.
CPC .......... *G06F 9/5083* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 5,778,206 A | 7/1998 | Pain et al. | |
| 7,945,750 B2 | 5/2011 | Arakawa et al. | |
| 8,694,698 B2 | 4/2014 | Mizuno et al. | |
| 10,025,599 B1* | 7/2018 | Goodson | G06F 9/4411 |
| 2006/0271815 A1 | 11/2006 | Mizuno et al. | |
| 2007/0053369 A1* | 3/2007 | Mizutani | H04J 3/1617 |
| | | | 370/401 |
| 2007/0067780 A1* | 3/2007 | Kumar | G06F 9/542 |
| | | | 719/318 |
| 2007/0245106 A1 | 10/2007 | Maki et al. | |
| 2008/0168130 A1* | 7/2008 | Chen | G06F 9/5027 |
| | | | 709/203 |
| 2012/0033612 A1* | 2/2012 | Jazra | H01H 33/22 |
| | | | 370/328 |
| 2012/0151358 A1 | 6/2012 | Joanny et al. | |
| 2013/0039207 A1 | 2/2013 | Vadasz | |
| 2013/0311780 A1 | 11/2013 | Besehanic | |
| 2014/0244721 A1 | 8/2014 | Taine et al. | |
| 2015/0288593 A1* | 10/2015 | Campbell | G06F 16/957 |
| | | | 709/224 |

(Continued)

OTHER PUBLICATIONS

Office Action for U.S. Appl. No. 14/749,273, dated May 16, 2017, David Whitney, "Asynchronous Provision of Resource Status Data", 12 pages.

*Primary Examiner* — Meng Ai T An
*Assistant Examiner* — Zujia Xu
(74) *Attorney, Agent, or Firm* — Lee & Hayes, P.C.

(57) ABSTRACT

Client application (112) submits request (118) to resource status service (110) for resource status data ("data") regarding one or more computing resources (108) provided in a service provider network (102). The resource status service submits requests to the resources for the data. The resource status service provides a reply to the client application that includes any data received from the resources within a specified time. If all requested data was not received from the resources within the specified time the resource status service can also provide, in the reply, an identifier ("ID") that identifies the request and can be utilized to identify and retrieve additional status data received at a later time. The client application can also submit additional requests for the status data, and may include the ID, may wait for additional data to be pushed to it, or may check a queue for the status data.

20 Claims, 9 Drawing Sheets

(56) References Cited

U.S. PATENT DOCUMENTS

| | | | |
|---|---|---|---|
| 2015/0339928 A1* | 11/2015 | Ramanujam | G06Q 50/30 |
| | | | 701/23 |
| 2015/0358217 A1* | 12/2015 | Wang | H04L 43/04 |
| | | | 709/203 |
| 2016/0171540 A1* | 6/2016 | Mangipudi | G06Q 30/0255 |
| | | | 705/14.53 |
| 2016/0196508 A1 | 7/2016 | Richter | |
| 2017/0276760 A1* | 9/2017 | Alsehly | G01S 5/0236 |

* cited by examiner

SYNCHRONOUS AND ASYNCHRONOUS RESPONSES TO DATA REQUESTS FROM REMOTE DEVICES

BACKGROUND

Network-based service provider networks exist that allow customers to purchase and utilize various types of computing resources on a permanent or as-needed basis. For example, a service provider network ("SPN") may permit customers to purchase and utilize computing resources such as virtual machine ("VM") instances, data storage resources, database resources, networking resources, network services, and other types of computing resources. Customers may configure the computing resources provided by an SPN to implement desired functionality, such as to provide a network-based application, obtain, modify, or store data, or another type of functionality. One example of such a service is Amazon® Web Services ("AWS").

Managing computing resources provided by network services in an SPN such as those described above can present unique technical challenges. For example, it may be challenging to obtain information describing the operational status of computing resources from a large number of network services executing on different server computers in different data centers in a SPN.

Networked services often provide two primary call modes for a customer to place a remote function call to the SPN to obtain data, such as the status of various resources: a synchronous call mode, and an asynchronous call mode.

A customer often does not have the information needed to make an informed decision, based on current information, as to whether to place a synchronous function call or an asynchronous function call. Also, rather than expend the time and/or resources to obtain and evaluate one or more factors to make such a decision, the customer may just decide to place all calls to that function (or even to all functions) in the same manner, i.e., all calls as synchronous function calls, or all calls as asynchronous function calls. But, by making all function calls to be the same, the customer may be relinquishing the opportunity for a faster response and/or may be unnecessarily wasting time, may be paying higher fees than necessary, and may be using resources by unnecessarily establishing and breaking down communication channels multiple times.

The disclosure made herein is presented with respect to these and other considerations.

DETAILED DESCRIPTION

Figure 1:
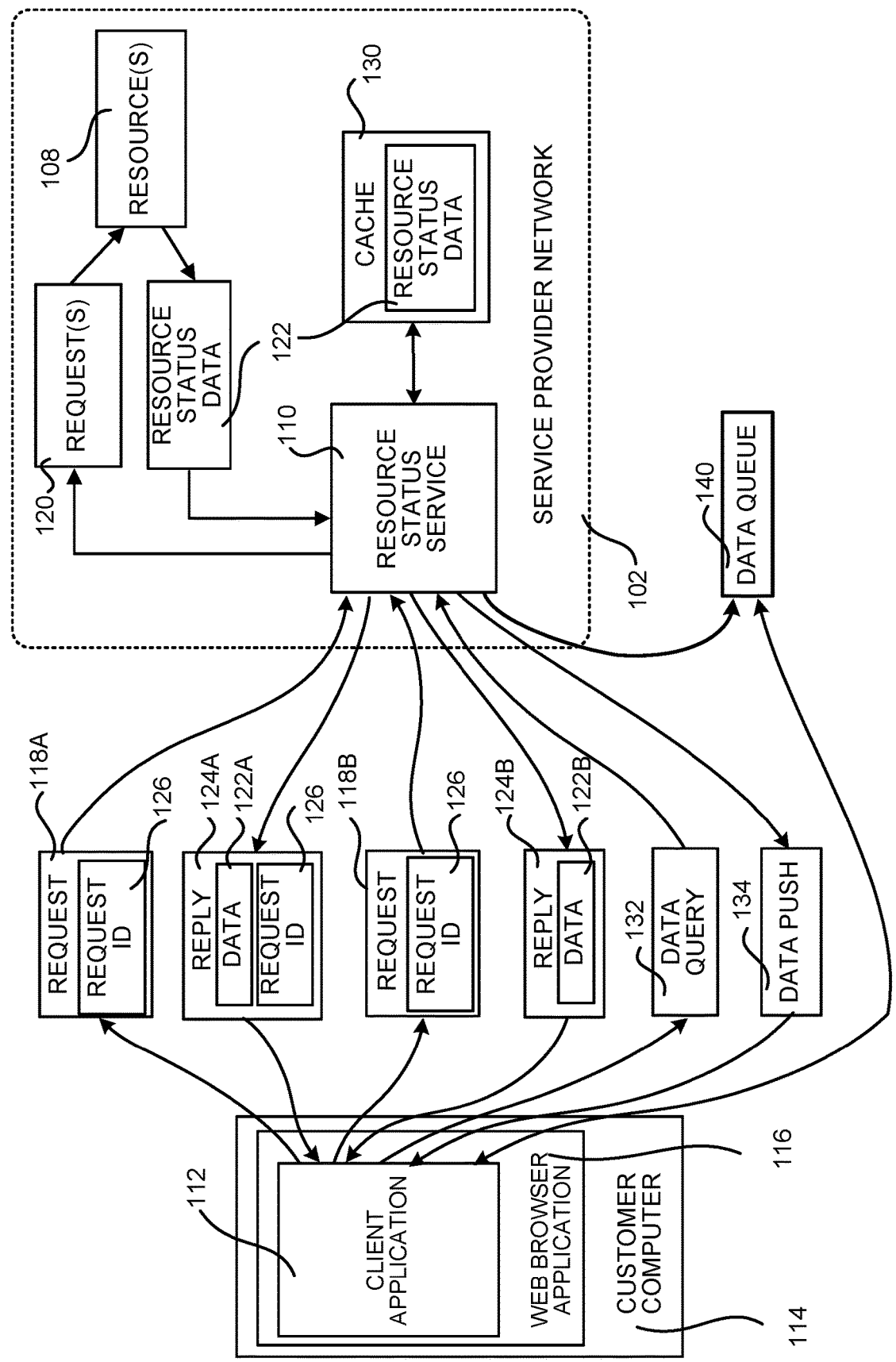
FIG. 1 illustrates an exemplary operating environment having an SPN and at least one customer computer.

The following detailed description is directed to technologies for providing data in response to a function call.

Generally, in a synchronous function call mode, the customer opens a communication channel to the SPN and sends a synchronous function call, such as the AWS "Invoke/RequestResponse" command. The synchronous function call is often used when the customer quickly needs the response from the SPN, such as before the customer can take a further action or make a decision regarding a further action. The SPN gives a synchronous function call a higher priority than an asynchronous function call and attempts to obtain the requested data and send the requested data in a response to the customer within some predetermined time over the same communication channel. Once the response has been sent the communication channel is then closed. In some cases, one or more of the network services may require a relatively long period of time to respond to requests for status data regarding the computing resources that they provide. If, however, the SPN is not able to obtain and send the requested data within that predetermined time then a time-out error may occur. The synchronous function call mode has the advantage of providing a faster response, but has the disadvantage of holding the communication channel open while the requested data is being obtained and sent, or a time-out occurs. Holding the communication channel open possibly prevents the customer and/or the SPN from using that communication channel for another purpose, such as obtaining other data from the same or a different SPN, or handling another customer.

In the asynchronous function call mode the customer opens a communication channel to the SPN and sends an asynchronous function call, such as the AWS "Invoke/Event" command. The asynchronous function call is often used when the customer does not need the data quickly, such as when there are other actions and decision the customer can make while waiting for the data, or when the customer does not want to pay for the quicker action prompted by a synchronous function call. The SPN attempts to obtain the requested data and send it to the customer within some predetermined time over the same communication channel. If all the requested data is available within the predetermined time the SPN sends the data to the customer over the same communication channel, and then the communication channel is closed. The predetermined time for the response in the asynchronous mode may be the same, or different from, the predetermined time for the response in the synchronous mode.

The requested data may range, for example, from, the current date and time, to resource status data, e.g., what resources the customer is currently using, what resources are available, the time before a resource might be available, how much of a customer's allotted resources have been used, the current and/or historical utilization of one or more network resources, such as processing time, memory usage, etc. The function call may be considered to be associated with a request for data in that it may request data and also may request that the SPN perform another function or functions to generate the data as well. For convenience of discussion, and to illustrate one implementation, the data requested by the customer and provided by the SPN is resource status data.

As disclosed herein, a client application submits a request (which may also be referred to herein as a function call) to a resource status service for data. The function call may also request that the SPN perform a particular function or functions to generate the data, so the function call may be considered to be associated with a request for data. The functions may be programs available on the resource status service or on the computing resources, and may have been provided by a customer of the service provider network. The data may be, for example, resource status data regarding one or more computing resources provided in the SPN. The resource status service then submits requests to the computing resources for the data and receives responsive data from the computing resources. The resource status service provides a reply to the client application that includes any data received from the resources within a specified time. If all the requested data is not received from the resources within the specified time the resource status service can also provide, in the reply, an ID, such as the ID mentioned above. The specified time may be determined by the customer and submitted via the customer computer or by other means, the specified time may be determined by a default setting of the service provider network, by a contractual agreement between the service provider and the customer, an average time of the computing resources, such as a recent average response time, as a parameter in the request, the parameter in the previous request, or by another means. The specified time may be, for example, 100 milliseconds, 4 seconds, 6 minutes, etc. The ID may be generated, for example, by the resource status service when it receives a new request, or by the client application when it sends a new request. The client application can then submit additional requests for the data, wait for additional data to be pushed to it by the resource status service, or check a queue for the data.

Additional details regarding the various components and processes described briefly above for provision of resource status data are presented below. In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS."). Also, where there are plural items having the same reference number, they may be referred to herein collectively with that reference number, or individually with that reference number, as the context might require. For example, network services 106A, 106B, 106C, etc. of FIG. 2 may be referred to collectively as network services 106, or individually as a network service 106, as the context might require.

FIG. 1 illustrates an exemplary operating environment having an SPN 102 and at least one customer computer 114. Although, for convenience of illustration, only one customer computer 114 is shown, typically, multiple customer computers 114 will access the SPN 102. The SPN 102 is a distributed network service through which customers and/or other users can utilize computing resources 108 (which might be referred to herein simply as "resources"), such as VM instances and/or other types of computing resources, on a permanent or as-needed basis.

Each type or configuration of a computing resource 108 may be available from the SPN 102 in different sizes. For example, a service provider might offer physical hosts, VM instances or other types of data processing resources that are available for purchase and use that have many different configurations of processor capabilities, main memory, disk storage, and operating system. A service provider operating the SPN 102 might also offer other types of computing resources 108 for purchase and use by customers. For example, a service provider might offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources 108 or services on a permanent or as-needed basis. The computing resources 108 might also include, but are not limited to, VM instances and images, security groups, option groups, gateways, option sets, network access control lists ("ACLs"), subnets, storage buckets, network interfaces, snapshots, spot market requests, and storage volumes.

The service provider operating the SPN 102 might also charge a fee for utilization of the computing resources 108 to a customer that creates and uses the resources. The fee charged for a particular computing resource 108 might be based upon the type and/or configuration of the computing resource 108. For example, in the case of a data processing computing resource, like a VM instance, the fee for use of the computing resource 108 might be charged based upon the amount of time the computing resource 108 is utilized. In the case of a data storage computing resource 108, the fee might be computed based upon the amount of data stored and/or the amount of data transferred into or out of the computing resource 108. The fee for a network connection or channel might be computed based on the amount of time that the connection or channel is held open, and/or each time a connection or channel is opened or closed. Different fees might also be charged for synchronous function calls and asynchronous function calls, and the desired response time for a synchronous call. The fees for other types of resources 108 might also be based upon other considerations. A service provider might also utilize various purchasing models to determine the amount to charge a customer for use of resources 108 provided by the SPN 102.

The resources 108 might also be provisioned and de-provisioned as needed in an automated fashion. For example, the SPN 102 might be configured to create a new instance of a computing resource 108, such as a VM instance, in response to an increase in demand for a network service or other condition. Other types of computing resources 108 might also be provisioned and de-provisioned in a similar manner. Services in the SPN 102 might also provide functionality for automatically scaling and/or de-scaling resources 108 based upon demand for the resources and/or other factors.

Figure 5:
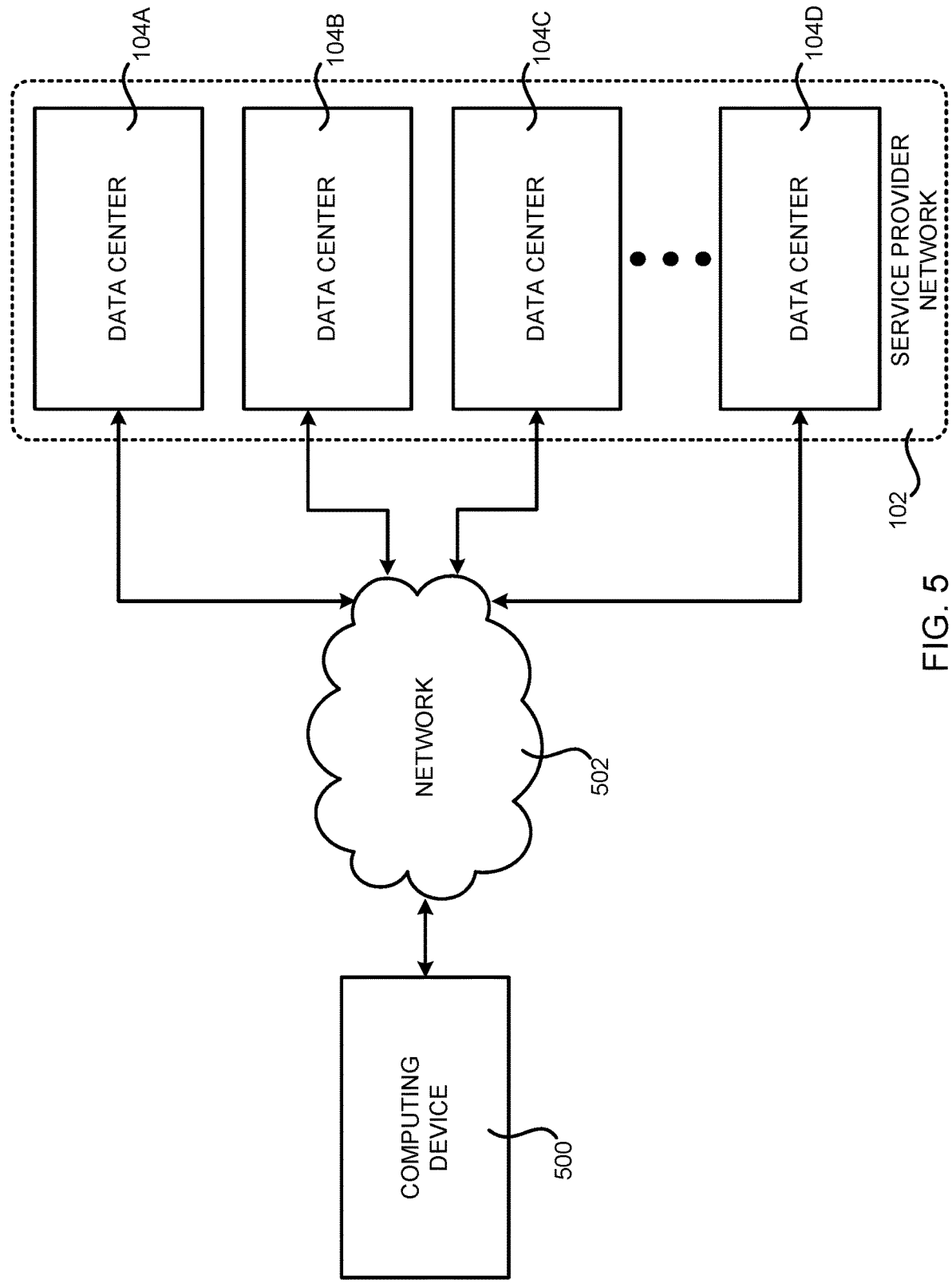
FIG. 5 is a system and network diagram that shows an illustrative operating environment that includes an SPN that may be configured to implement aspects of the functionality described herein.

A customer or potential customer of the SPN 102 might utilize an appropriate computing system, such as the customer computer 114, to communicate with the SPN 102 over an appropriate data communications network (see FIG. 5). In this way, a customer of the SPN 102 can configure various aspects of the operation of the computing resources 108 provided by the SPN 102, or to otherwise control any computing resources 108 being utilized by the customer. For example, and without limitation, a computing system utilized by a customer of the SPN 102, such as the customer computer 114, might be utilized to purchase computing resources 108 in the SPN 102, to configure aspects of the operation of the computing resources 108 through a management console or other type of interface, to access and utilize functionality provided by the various services and systems described herein, and/or to perform other types of functionality with regard to the operation of the computing resources 108 provided by the SPN 102.

The customer computer 114 might be any type of computing device capable of connecting to the SPN 102 via a suitable communication channel over a suitable data communications network. The customer computer 114 may be, for example, a laptop or desktop computer, a tablet computing device, a server computer, or a smartphone. Administrative users employed by the operator of the SPN 102, such as administrators managing the operation of the SPN 102, might also connect with, manage, and utilize resources 108 provided by the SPN 102 in a similar fashion.

A resource status service 110 is executed in the SPN 102 in an example configuration. The resource status service 110 is a network service that executes in the SPN 102 and is configured to receive and respond to requests for resource status data 122. The resource status service 110 can expose a suitable interface, such as a network services API, through which client applications or services can request resource status data 122 for a collection of computing resources 108, such as all or a group of computing resources 108 purchased by a customer of the SPN 102.

A client application (resource status application) 112 can also be provided that is configured to obtain and display the resource status data 122 in a suitable GUI or in another manner. In an example configuration, the client application 112 is implemented as a web application that executes all or in part within a Web browser application 116. Other types of applications that execute natively or in another manner might, however, utilize the functionality provided by the resource status service 110.

As mentioned above, the customers of the SPN 102, or the client application 112 of a customer computer 114, might not have the information needed to make the optimal decision at the time of each function call, or might not wish to obtain and/or evaluate that information to make a decision. Further, the use of an increasing wait time between requests, or even a fixed wait time between requests, can add unnecessary delay to the transfer of the requested data, such as where there is a function call from a client application 112 of a customer computer 114 to the SPN 102, the SPN 102 responds with a notice of a wait time, and the data becomes available immediately after the notice of the wait time, or at least before the wait time has expired.

The SPN 102, however, often does have relevant information, and may even already have the requested data 122. For example, consider an SPN 102 that caches responses from previous function calls, especially function calls which require more than an insignificant amount of time for a response to be prepared. When the SPN 102 receives a function call the SPN 102 can rapidly determine whether a response has already been obtained, e.g., a response is already in a cache 130. If the response (the resource status data 122) has already been obtained the SPN 102 can quickly respond regardless of whether the customer had sent a synchronous function call or an asynchronous function call. If the customer sends a synchronous function call and the requested data has already been obtained the customer may be unnecessarily incurring a fee for the quick response. If the customer sends an asynchronous function call and the requested data has not already been obtained the SPN 102 can respond in an asynchronous mode, but the wait time may cause a delay in the transfer of data that could have been avoided if the customer had placed a synchronous function call.

Accordingly, rather than the customer having to decide whether to send a synchronous function call or an asynchronous function call, in an implementation the customer sends a Flexible Response Function Call ("FRFC"). In an implementation, the customer opens a communication channel to the SPN and sends an FRFC to the SPN. The FRFC, as in both the synchronous function call and the asynchronous function call discussed above, specifies the data that is requested.

In response to the FRFC, the SPN obtains the requested data and, using that same communication channel, sends a response to the customer which preferably includes all the requested data, or at least all the available requested data. The resource may include all the requested if, for example, the resource 108 quickly responds with the requested data, or the requested data was previously obtained and stored, such as in the cache 130, in response to an earlier function call. The response may also include a notice whether the data that is sent is complete or incomplete, or the client application 112 may determine whether the received data is complete, such as by comparing the requested data which was received with the parameters of the function call request that was sent. If all the requested data was not available, the SPN may optionally include a request ID in the response. The communication channel is then closed.

In this implementation, and unlike in the case of the response to the conventional asynchronous function call mentioned above, the customer is not expecting the response to include a wait time, and the SPN preferably does not send a wait time, even if the data sent does not include all of the requested data. If the data sent by the SPN 102 to the client application 112 does not include all the requested data, the client application will be expecting the SPN 102 to push more data at a later time, or push a notice that the data is available, such as via a notification service, such as the Amazon Simple Notification Service ("SNS"). If such a notice is sent then, in response to the notice, the customer can send another FRFC to the SPN to obtain the data. Alternatively, or additionally, the SPN 102 can push the data or the notice to a queue service, such as the Amazon Simple Queue Service ("SQS"), and the client application 112 can poll the queue when desired. The wait time mentioned above is preferably not used, so as to speed the availability of the data to the customer as compared with the asynchronous function call.

Therefore, through an implementation of these technologies, the customer, including client applications of the customer, can request and receive resource status data that describes the operational status of computing resources in an SPN from a resource status service in the SPN in a manner that does not require the customer to choose between a synchronous function call and an asynchronous function call.

In an example configuration, a resource status service 110 executes in the SPN 102 and is configured to receive and respond to requests for data, such as an FRFC request for resource status data. The resource status data describes aspects of the operational status of computing resources provided by network services executing in the SPN 102. The resource status service 110 can expose a suitable interface, such as a network services application programming interface ("API"), through which customers can request resource status data for a collection of computing resources, such as resource(s) 108.

Also, a client application 112, which might also be referred to herein as a "resource status application", requests, receives, and possibly displays the resource status data in a suitable graphical user interface ("GUI") or in another manner. The client application 112 can submit an FRFC to the resource status service 110 for data, such as resource status data regarding one or more computing resources provided by the network services in the SPN, such as all or a group of resources assigned to a particular customer of the SPN.

In response to receiving the FRFC request 118A from the client application 112, the resource status service 110 can submit requests, preferably synchronous requests, to the appropriate network services for the requested resource status data 122. In some configurations, the network services from which the resource status data 122 is obtained are executing in different data centers located in different geographic regions.

The resource status service 110 can also provide a reply to the client application 112 that may include part or all of the requested data 122. As the resource status service 110 receives the resource status data 122 from the network services, the resource status service 110 preferably stores the resource status data in a cache 130 that is accessible to multiple instances of the resource status service 110. The cache entries may be associated with the ID assigned to the request from the resource status application. If, by the end of the appropriate time period after receipt of the request 118A, all requested data has been obtained, the SPN 102 will send that data 122 to the customer over the existing communication channel and then close that communication channel.

If, by the end of the appropriate time period after the request, all requested data has not been obtained, the SPN will send the available data to the customer over the existing communication channel and then close that communication channel. As the requested data is being obtained and placed in the cache the SPN will send either the newly-obtained data or the notice of available data to the client application. The notice may include the ID of the relevant cache.

The client application may begin operating on and/or displaying the data once the client application has obtained at least some of the requested data from the resource status application.

In some configurations, the resource status service will wait until all of the requested resource status data has been obtained and stored in the cache (i.e., for a multitude of computing resources) before sending the aggregated resource status data to the client application or sending a notice that the data is available. In other configurations, the resource status service will provide partial results stored in the cache, or a notice of partial results, to the client application as the partial results are returned from the network service.

In an example configuration, the client application 112 submits an FRFC or "request" 118A to the resource status service 110 for resource status data 122 regarding one or more computing resources 108 in the SPN 102, such as all or a group of resources 108 assigned to a particular customer of the SPN 102. The request 118A may identify the resources 108 for which resource status data 122 is requested and may optionally provide a request ID number which identifies the new request.

In response to receiving the request 118A for resource status data 122 from the client application 112, the resource status service 110 can submit synchronous requests 120 to the resources 108 for the requested resource status data 122. For instance, in the example shown in FIG. 1, the resource status service 110 has submitted request(s) 120 to the resources 108. In some configurations, the resources 108 from which the resource status data 122 is obtained are executing in different data centers located in different geographic regions. For example, one resource 108 might be located in North America, while another resource 108 is located in Japan.

If the resource(s) 108 respond with the requested resource status data 122 within the specified time, the resource status service 110 preferably stores the resource status data 122 in a cache 130. The resource status service 110 preferably provides a reply 124A to the request 118A that includes the available resource status data 122A. However, it is not uncommon for the resources 108 to take a relatively long period of time to respond to such requests. In this case, the resource status service 110 can provide the reply 124A to the request 118A that includes any available data 122A. The reply 124A may also optionally include the request ID (shown in FIG. 1 as the "request ID 126").

Figure 2:
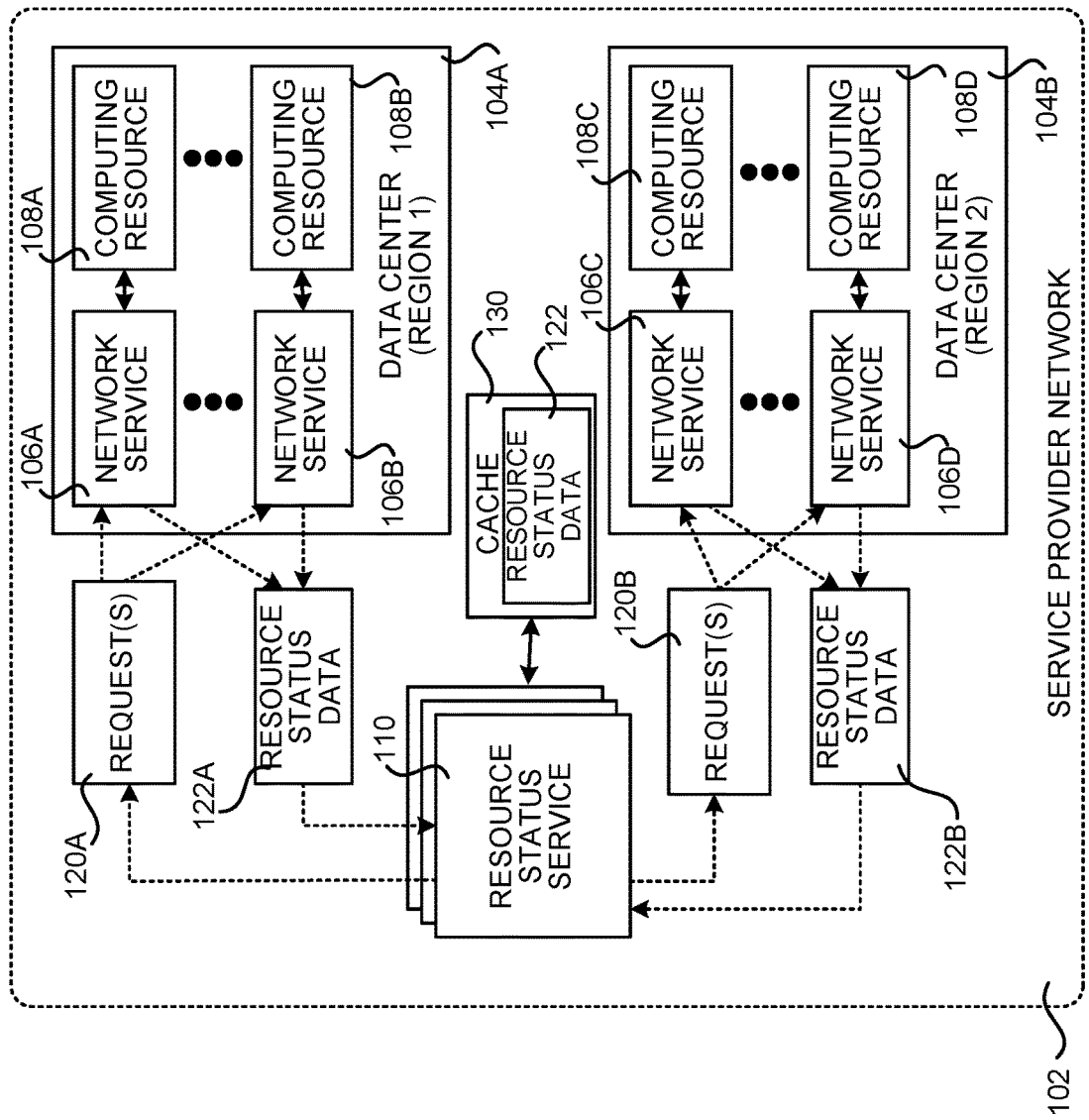
FIG. 2 is a system architecture diagram showing aspects of the configuration and operation of the SPN.

The cache 130 is preferably accessible to multiple instances of the resource status service 110 (see FIG. 2). The cache 130 entries may be associated with the request ID 126. The cache 130 is implemented as an in-memory cache. For example, the cache 130 might be implemented using the MEMCACHED distributed in-memory cache. Other types of caches might also be utilized. In this regard, it should be appreciated that many instances of the resource status service 110 can be utilized and that each of the instances of the resource status service 110 can process any request for resource status data 122 in the manner described herein.

In an example configuration, the resource status service 110 waits until all of the requested resource status data 122 has been obtained and stored in the cache 130 (e.g., from a multitude of resources 108 before providing all the requested resource status data 122 to the resource status application 110 in the reply 124A to the request 118A.

In another configuration, the resource status service 110 will provide partial results stored in the cache 130 to the client application 112 as the partial results are returned from the resources 108.

If the resource status data 122A sent in reply 124A was incomplete then additional resource status data 122 can be provided to the client application 112 when the resource status service 110 receives additional resource status data 122 from the resource(s) 108. When the resource status service 110 receives some, more, or all of the remaining resource status data 122 from the resources 108, the resource status service 110 preferably also stores the newly-received resource status data 122 in the cache 130.

The client application 112 may receive the additional resource status data 122 from the resource status service 110 via a data query 132 or a data push 134, or by polling a data queue 140. The data queue 140 may be internal or external to the service provider network 102. In an example configuration, the data queue 140 is preferably the Amazon Simple Queue Service mentioned above. The client application 112 also may optionally send one or more subsequent FRFC requests 118B to the resource status service 110 for the resource status data 122. The subsequent FRFC request(s) 118B may optionally use the request ID 126 to indicate that this request is a request for more data related to a previous request 188, and is not a new request 118.

When the resource status service 110 receives some, more, or all of the remaining resource status data 122 from the resources 108 the resource status service 110 preferably sends the newly-available data, or a notice that data is available, to the client application 112 by, for example, pushing 134 the data or the notice to the client application 112. In an example configuration, the data is pushed to the client application 112 via the Amazon Simple Notification Service mentioned above.

Some customers may not wish to have data pushed to them at unpredictable times or intervals, but would prefer to check on the availability of the data in accordance with their own schedule. Therefore, resource status service 110 can push the data to the data queue 140. The client application 112 can then poll the data queue 140 as desired to determine if additional data is available. The data queue 140 may be part of, or may be separate and independent from, the SPN 102.

In another configuration, the resource status service 110 pushes a notice to the data queue 140 that more data is available. The notice may optionally include the request ID 126. When the client application 112 polls the queue 140 and receives the notice that data is available, the client application 112 can send another FRFC request 118 to the resource status service 110, optionally including the request ID 126, and the resource status service 110 will then send a reply 124B with the newly-available data 122B to the client application 112.

The above pushes, notices, polls, and/or FRFC requests are repeated until the client application 112 has received all the requested data. The client application 112 may process and/or display the requested data as it is received or may wait until all of the requested data has been received.

In an example configuration, the synchronous function call, the asynchronous function call, and the FRFC each have a code, value, or format so that they can be distinguished from each other and, in this preferred configuration, the SPN 102 can respond according to the particular function call sent by the customer computer 114. Thus, if the customer computer 114 sends a synchronous function call the SPN 102 will respond in a manner, time, and format appropriate for a synchronous function call; if the customer computer 114 sends an asynchronous function call the SPN 102 will respond in a manner, time, and format appropriate for an asynchronous function call; and if the customer computer 114 sends an FRFC the SPN 102 will respond in the manner, time, and format appropriate for the FRFC, as described herein.

Thus, briefly stated, a client application 112 submits a request 118 to a resource status service 110 for resource status data regarding one or more computing resources 108 provided in the SPN 102; the request 118 may optionally contain a request ID 126. The resource status service 110 then submits requests to the resources 108 for the data. The resource status service 110 provides a reply 124A to the client application that includes any data 122A received from the resources 108 within a specified time. If all the requested data is not received from the resources 108 within the specified time the resource status service 112 can also provide, in the reply, the request ID 126. The client application 112 can also submit additional requests 118B for the data, wait for additional data to be pushed 134 to it, or check 140 a queue for the data.

In another implementation, the desired data may not exist in a database, e.g., it must be created. To accommodate this situation, the request 118 may include a reference to a program or code which generates, processes, and/or modifies the data. For example, in the Amazon AWS Lambda service, a developer may write program code to perform a particular function or functions and upload that code to the Lambda service. Then, when the program is invoked, the Lambda service will execute the code and generate the results for the function(s) of the code. Therefore, when a request 118 contains a reference to the uploaded program, the AWS Lambda service will execute that program and provide the results, which can then be provided to the client application 112 via a push to the program or a push to a data queue 140. The request, or the program code, can also specify how the results are to be provided, for example, to the client application 112, over a particular communication channel, via SNS, via SQS, to the data queue 140, etc.

FIG. 2 is a system architecture diagram showing aspects of the configuration and operation of the SPN 102. The resources 108 may be provided in one particular implementation by one or more data centers 104A and 104B operated by the service provider. As known to those skilled in the art, data centers 104 are facilities utilized to house and operate computer systems and associated components. Data centers 104 also typically include redundant and backup power, communications, cooling, and security systems. The data centers 104A and 104B might be located in geographically disparate regions, and might also be connected to various other facilities, such as co-location facilities, and various wide area networks ("WANs"), such as the Internet. In this regard, it should be appreciated that while only two data centers 104 are shown, more or fewer data centers 104 might be utilized in other configurations.

The resources 108 may be provided in one particular implementation by one or more data centers 104A and 104B operated by the service provider. As known to those skilled in the art, data centers 104 are facilities utilized to house and operate computer systems and associated components. Data centers 104 also typically include redundant and backup power, communications, cooling, and security systems. The data centers 104A and 104B might be located in geographically disparate regions, and might also be connected to various other facilities, such as co-location facilities, and various wide area networks ("WANs"), such as the Internet. Additional details regarding the configuration and operation of the data centers 104A and 104B are provided below with regard to FIGS. 5 and 6. In this regard, it should be appreciated that while only two data centers 104 are shown in FIG. 2, one, three, or more data centers 104 might be utilized in other configurations. As mentioned above, the SPN 102 might also be configured to execute various types of network services to provide the computing resources 108. For example, and without limitation, the SPN 102 may provide an on-demand computing service for providing VM instances on-demand, a data storage service for providing data storage resources and, potentially, other types of network-accessible services 106 for providing other types of computing resources 108. In the example shown in FIG. 2, for instance, the network service 106A provides the computing resource 108A, the network service 106B provides the computing resource 108B, the network service 106C provides the computing resource 108C, and the network service 106D provides the computing resource 108D. These and other network services 106 and their associated computing resources 108 may be utilized together to implement various types of network-based applications in the SPN 102. Some network services 106 executing within the SPN 102 might also utilize the functionality provided by the resource status service 110.

The network services 106 can also be configured to expose interfaces, such as a network services API, through which other services can obtain resource status data 122 that describes aspects of the operational status of the computing resources 108 that they provide. For instance, a network service 106 configured to provide VM instances, might expose an API through which callers can obtain information regarding the operational status of the VM instances. In a similar fashion, a network service 106 that provides storage resources can provide resource status data 122 regarding the storage resources. Other types of network services 106 can provide other types of resource status data 122 for other types of computing resources 108. Additional details regarding one implementation of the SPN 102 and the various types of network services 106 that might be provided by the SPN 102 are discussed below.

It should be appreciated that the various examples of resource status data 122 described above are merely illustrative and that the term "resource status data" as used herein encompasses virtually any type of data that can be provided by network services 106 operating in an SPN 102. For example, and without limitation, resource status data 122 includes, but is not limited to, data describing the status of the network services 106 or the computing resources 108 that they provide, data describing relationships between the network services 106 or the computing resources 108 that they provide, objects created or maintained by the network services 106 or the computing resources 108 that they provide, data in a database, or other data or metadata pertaining to the network services 106 or the computing resources 108 that they provide.

In an example configuration, the resource status application 112 submits a request 118A to the resource status service 110 for resource status data 122 regarding one or more computing resources 108 provided by network services 106 in the service provider network 102, such as all or a group of resources 108 assigned to a particular customer of the service provider network 102. The request 118A may identify the resources 108 for which resource status data 122 is requested and may optionally include a request ID 126.

In response to receiving the request 118A for resource status data 122 from the resource status application 112, the resource status service 110 submits synchronous requests 120 to the appropriate network services 106 for the requested resource status data 122. For instance, the resource status service 110 has submitted requests 120A and 102B to network services 106A-106D executing in the data centers 104A and 104B. In some configurations, the network services 106 from which the resource status data 108 is obtained are executing in different data centers 104 located in different geographic regions. For example, the data center 104A might be located in North America, while the data center 104B is located in Japan.

Figure 3:
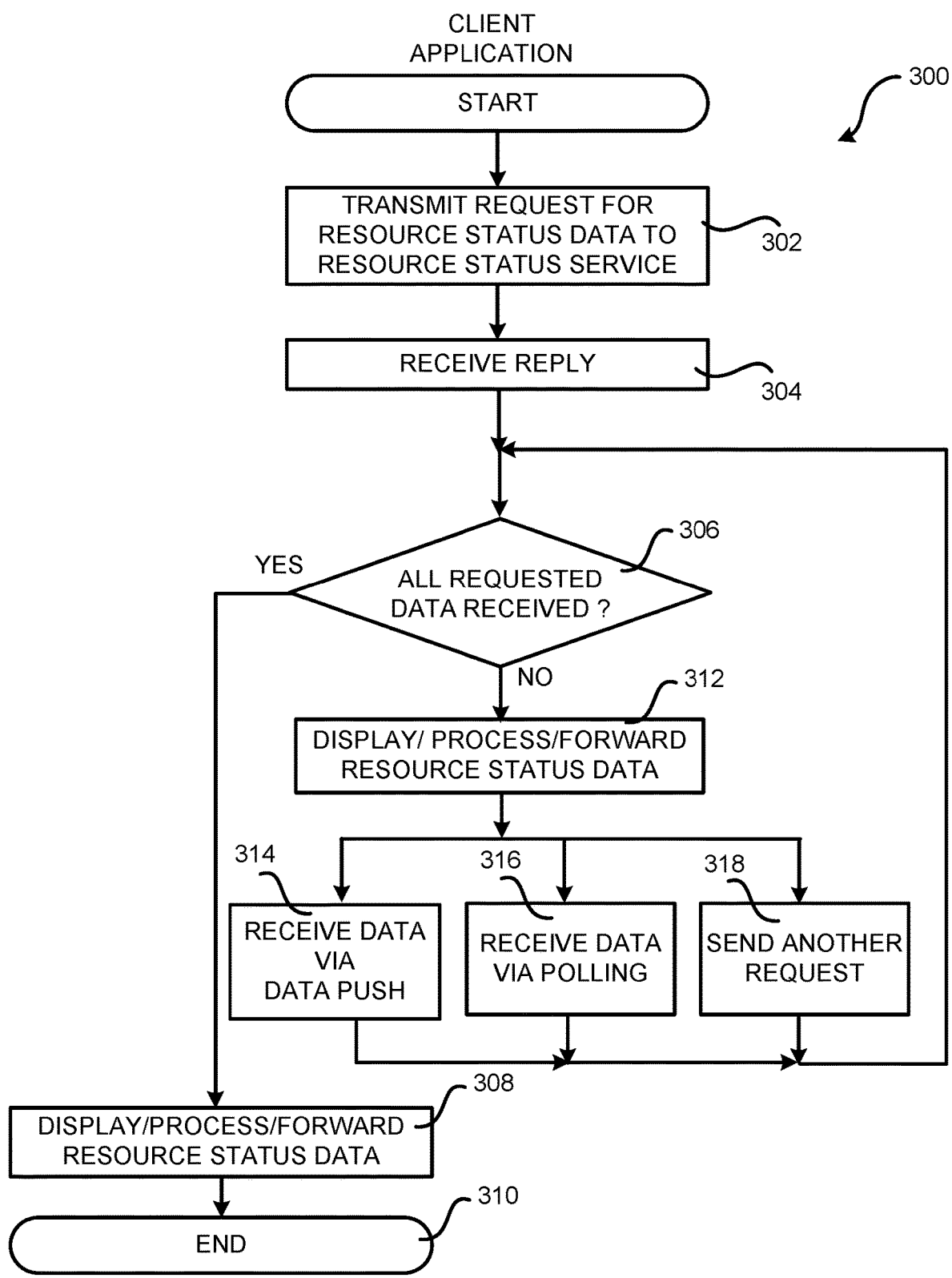
FIG. 3 is a flow diagram showing a routine that illustrates aspects of the operation of a client application configured to obtain resource status data from the resource status service, in one particular configuration disclosed herein.

FIG. 3 is a flow diagram showing a routine 300 that illustrates aspects of the operation of the client application 112 configured to obtain resource status data 122 from the resource status service 110, in one particular configuration disclosed herein.

The routine 300 begins at operation 302, where the resource status application 112 transmits a request 118 to the resource status service 110 for resource status data 122 for one or more resources 108 in the SPN 102. If the request 118 is an initial request 118A, the request 118A will identify the particular resource status data 122 that is requested. If the request 118 is a subsequent request 118B, the request 118B may again identify the particular resource status data 122 or may simply include the request ID 126.

The routine 300 then proceeds from operation 302 to operation 304. At operation 304, the client application 112 receives a reply 124 to the request 118 submitted at operation 302. The reply 124 provided by the resource status service 110 preferably provides the available requested resource status data 122 if the resource status data 122 is incomplete and preferably provides all the requested resource status data 122 if the resource status data 122 is complete. If the resource status data 122 is incomplete the resource status service 110 may optionally also include the request ID 126. The resource status service 110 may optionally also advise the client application 112 whether the resource status data 122 that was sent is complete or incomplete. The resource status service 110 may also advise the client application 112 of the estimated time before a complete response will be provided. The client application 112, or a user of the client application, may use the estimated time to determine whether to cancel the request the data, or to interrupt or delay a program that uses that data. This conserves resources in that the client application 112 will not request the data again until that time has elapsed, thereby conserving processing power and network bandwidth.

From operation 304, the routine 300 proceeds to operation 306. At operation 306, the client application 112 determines whether the reply 124 includes all the requested resource status data 122. The client application 112 may make that determination based upon a comparison of the requested data and the received data, or may make that determination based on the advice from the resource status service 110 as to whether the resource status data 122 that was sent is complete or incomplete. If the reply 124 includes all the requested resource status data 122 the client application 112 proceeds from operation 306 to operation 308, where the client application 112 displays the resource status data 122 in an appropriate GUI, processes the resource status data 122, and/or forwards the resource status data 122 to another application or device. The client application 112 might also, or alternatively, perform other operations on the resource status data 122. The routine 300 then proceeds from operation 308 to operation 310, where it ends.

If, at operation 306, the client application 112 determines that the reply 124 received at operation 304 does not include all the requested resource status data 122, the routine 300 proceeds from operation 306 to operation 312 where the client application 112 optionally displays the available resource status data 122 in an appropriate GUI, processes the resource status data 122, and/or forwards the resource status data 122 to another application or device. The routine 300 then proceeds from operation 312 to operation 314, operation 316, and/or operation 318. At operation 314 the client application 112 receives additional resource status data 122 via a data push operation by the resource status service 110. At operation 316 the client application 112 receives additional resource status data 122 via a data polling operation from the client application 112 to the queue 140. At operation 318 the client application 112 submits another request 118, preferably with the request ID 126. Preferably, the client application 112 accepts a customer selection to perform either operation 314 or operation 316, but not both. Operation 318 is optional and may be manually initiated by the customer, or may be automatically initiated if additional data is not received via operation 314 or operation 316 within a time predetermined by the customer. This is to accommodate a possibility that a push operation occurred, or a polling operation was attempted, but the communication was lost in transmission.

Figure 4A:
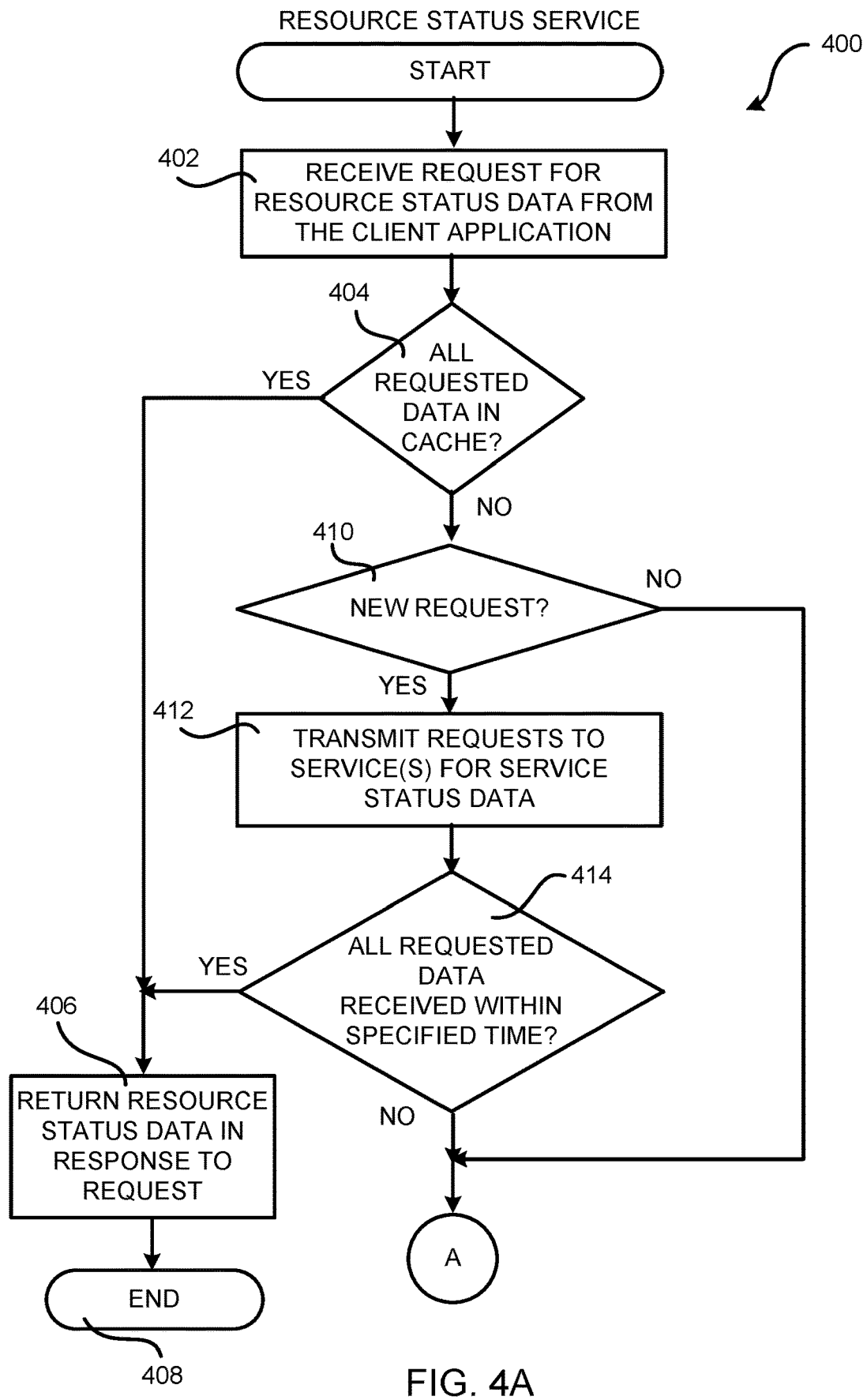
FIGS. 4A and 4B are a flow diagram showing a routine that illustrates aspects of the operation of the resource status service for providing resource status data, in one particular configuration disclosed herein.
Figure 4B:
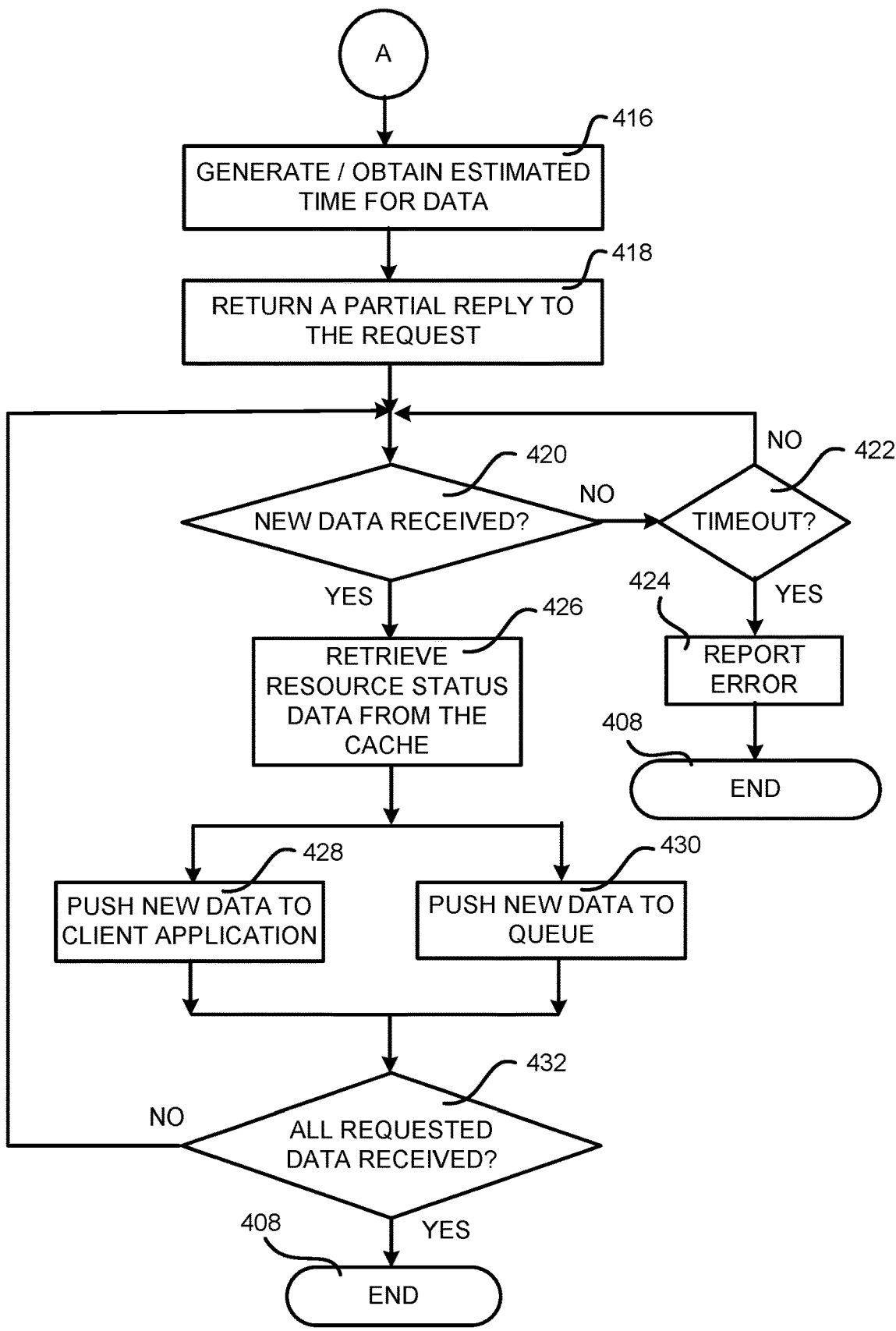

FIGS. 4A and 4B are a flow diagram showing a routine 400 that illustrates aspects of the operation of the resource status service 110 for asynchronously providing resource status data 122, in one particular configuration disclosed herein. The routine 400 begins at operation 402, where the resource status service 110 receives a request 118 for resource status data 122 from the client application 112. From operation 402, the routine 400 proceeds to operation 404.

At operation 404, the resource status service 110 determines whether the cache 130 contains all of the requested resource status data 122. If so then, at operation 406, a reply 124 is provided to the request 118 that includes the requested resource status data 122. Preferably, the reply 124 is immediately provided, rather than waiting until the end of the specified time. The routine 400 then ends at operation 408.

If at operation 404 all the requested resource status data 122 is not in the cache 130, the routine 400 proceeds from operation 404 to operation 410, where the resource status service 110 determines whether the received request 118 is a new request 118 (i.e. a request 118 that does not include a request ID 126 or correspond to a previously made request 118). If the request 118 received at operation 402 is a new request, the routine 400 proceeds from operation 410 to operation 412. If the request 118 received at operation 402 is not a new request 118, the routine 400 proceed from operation 410 to operation 416.

At operation 412, the resource status service 110 transmits synchronous requests 120 to the appropriate network services 106 for the requested resource status data 122. The resource status service 110 will receive replies to the requests 120 from the network services 106 and place the returned resource status data 122 in the cache 130 as it is returned.

From operation 412, the routine 400 proceeds to operation 414, where the resource status service 110 determines whether all requested data was received within the specified time, e.g., whether replies were received from all the network services 106 within the specified time. If all the requested resource status data 122 was received from the network services 106 within the specified time, the routine 400 proceeds from operation 414 to operation 406.

If, at operation 414, the resource status service 110 determines that all the requested resource status data 122 was not returned by the network services 106 within the specified time, the routine 400 proceeds from operation 414 to operation 416.

At operation 416 the resource status service 110 generates an estimated time to obtain all the data or all the remaining data, or the resource status service 110 requests such estimated time from another device, such as one of the computational resources 108. The routine 400 then proceeds to operation 418.

At operation 418, the resource status service 110 returns a partial reply 124 in response to the request 118 received at operation 402. The partial reply 124 may include the available data, a request ID 126 corresponding to the request 118, an indication whether the data or remaining data will be transferred asynchronously, the estimated time from operation 416 by which the data or remaining data will be provided, and/or the communication channel by which the data or remaining data will be provided if not previously configured for a particular communication channel. Preferably, the partial reply 124A will not be sent until close to the end of the specified time. This allows the maximum time for the requested data to be obtained so that a complete reply may be sent rather than a partial reply. This also conserves network bandwidth by eliminating a partial reply if a complete reply can be sent within the specified time.

If all data is not available within the specified time, the estimated time by which the data or remaining data will be provided may be based on one or more factors. For example, the estimated time may be based on: the average time for obtaining data for that particular customer may be determined, the recent or rolling average time for obtaining data for that particular customer may be determined, the average time for obtaining data for a particular group of customers may be determined, the recent or rolling average time for obtaining data for a particular group of customers may be determined, the average time for obtaining data from a particular resource may be determined, the recent or rolling average time for obtaining data for a particular resource may be determined, the average time for obtaining data for a particular group of resources may be determined, the recent or rolling average time for obtaining data for a particular group of resources may be determined, the average time for obtaining data for a particular parameter may be determined, the recent or rolling average time for obtaining data for a particular group of parameters may be determined, the average time for obtaining data from one or more resources at a particular geolocation may be determined, the recent or rolling average time for obtaining data from resources at a particular group of geolocations may be determined, the average time for obtaining data from a particular external resource, such as a resource provided by an unrelated third party, may be determined, and/or the recent or rolling average time for obtaining data from a particular group of external resources may be determined.

Further, the estimated time may be determined by the volume of requests, whether the requests are from the customer sending the particular request, from a group of clients, or from all clients. For example, a customer may have subscribed for service for X requests per hour. If the customer is exceeding the subscription limit, the resource status service 110 may "throttle" that customer by increasing the estimated time for a response until the customer is back within or close to the customer's subscription limit. The estimated time may be determined by the resource status service 110 when the request 118A is received, just before the partial reply 124 is sent, or at any time in between.

It may happen that, on occasion, one or more computing resources 108 experience a sudden increase in requests for service so that computing resources 108 are slower to respond and the estimated time provided to the customer in the partial reply 124 is incorrect. In that case a new estimated time may be determined and another partial reply 124B may be sent to the customer. Preferably, the new estimated time is provided to the customer prior to the expiration of the previous estimated time. Also, the resource status service 110 may, based upon a customer rating, a customer urgency rating, or some other criteria, determine to respond to some requests synchronously, and to respond to other requests asynchronously. Further, a computing resource 108 may, based on its own workload or other factors, reply to the resource status service 110 and advise the resource status service 110 that the reply 124 should advise the customer that the requested resource status data will be provided asynchronously, and the resource status service 110 will advise the customer accordingly via a partial reply 124.

From operation 418, the routine 400 proceeds to operation 420. At operation 420 the resource status service 110 determines whether new resource status data 122 has been received from one or more of the resources 108. If at operation 420 new resource status data 122 has not been received then, at operation 422, the resource status service 110 determines whether a timeout error has occurred, i.e., whether an excessive amount of time has passed since the last new resource status data 122 or since the request 402. If a timeout error has not occurred the routine 400 returns to operation 420. If a time out error has occurred the routine 400 proceeds to operation 424 where an error is preferably reported, and/or where corrective or other action may be taken. The routine 400 then ends at operation 408.

If, at operation 420, new resource status data 122 has been received then, at operation 426, the resource status service 110 retrieves the new resource status data 122 from the cache 130 and proceeds to either operation 428 or operation 430. In operation 428 the resource status service 110 sends the new resource status data 122 to the client application by a data push, as mentioned above. The routine 400 then proceeds to operation 432. In operation 430 the resource status service 110 sends the new resource status data 122 to a queue by a data push, as mentioned above. The routine 400 then proceeds to operation 432. Preferably, the resource status service 110 only performs one of operation 428 or operation 430, although the resource status service 110 could perform both operations 428 and 430.

At operation 432 the resource status service 110 determines whether all the requested resource status data has been received. If all the requested resource status data has not been received, the routine 400 returns to operation 420 to await additional resource status data. If all the requested resource status data has been received, the routine 400 ends at operation 408.

If at operation 410 the resource status service 110 determines that the request 118 received at operation 402 is a not a new request, the routine 400 proceeds from operation 410 to operation 416.

In another implementation of the operations depicted in and described with respect to FIGS. 3 and 4, a customer using the customer computer 114 and the client application 112, may send a request 118 for an estimate of how long it will take to obtain desired data, rather than sending a request for the data itself. This allows the customer, or even the client application 112 or another application on the customer computer 114, to make an informed decision whether to then request the data at that time, request the data at a later time, send two or more requests for different portions of the desired data, make another request for an estimate at a later time, obtain a request for an estimate from a different resource status service, request the data from a different resource status service, or even not to request the data. This conserves resources in that the customer will not request the resource status service 110 and the computing resources 108 to begin expending time, computing power, and network bandwidth, gathering data that will then arrive too late to be of value to the customer. In this implementation, the client application 112 would execute operation 302, but only request a time estimate rather than the data itself, and would then receive a reply 304 which contained the time estimate. The resource status service 110 would execute operation 402, operation 412 but only request a time estimate from the computing resources 108, and operation 412, wherein the time estimate would be provided.

It will be appreciated from the disclosure and drawings herein, especially the disclosure above and the related drawings, that the methods and devices disclosed herein provide an improvement to the performance of computing systems and networks, including service provider networks, by allowing the service provider network to choose the response to the function call in an informed manner, rather than requiring the customer of the service provider network to select either a synchronous function call or an asynchronous function call and repeatedly re-request the data from the service provider network. This conserves communication channel bandwidth and the processing power required to repeatedly receive and inspect repeated requests for the data.

FIG. 5 is a system and network diagram that shows one illustrative operating environment for the configurations disclosed herein that includes an SPN 102 that may be configured to provide functionality for asynchronously providing resource status data 122 in the manner described above according to an example configuration disclosed herein.

The customers and other users of the SPN 102 may access the computing resources 108 provided by the SPN 102 over a network 502, which may be a wide area communication network ("WAN"), such as the Internet, an intranet or an Internet service provider ("ISP") network or a combination of such networks. For example, and without limitation, a computing device 500 operated by a customer or other user of the SPN 102, such as the customer computer 114, might be utilized to access the SPN 102 by way of the network 502. It should be appreciated that a local-area network ("LAN"), the Internet, or any other networking topology known in the art that connects the data centers 104 to remote customers and other users may be utilized. It should also be appreciated that combinations of such networks might also be utilized.

The SPN 102 can execute network services 106 that provide computing resources 108 on a permanent or an as-needed basis. Among other types of functionality, the computing resources 108 provided by the SPN 102 can be utilized to implement the various services described above. The computing resources 108 provided by the SPN 102 may include various types of computing resources, such as data processing resources like VM instances, data storage resources, networking resources, data communication resources, network services, and the like. Each type of computing resource 108 provided by the SPN 102 may be general-purpose or may be available in a number of specific configurations. For example, data processing resources may be available as physical computers or VM instances in a number of different configurations. The VM instances may be configured to execute applications, including web servers, application servers, media servers, database servers, some or all of the services described above, and/or other types of programs. Data storage resources may include file storage devices, block storage devices, and the like. The SPN 102 might also be configured to provide other types of computing resources 108 not mentioned specifically herein.

The computing resources 108 provided by the SPN 102 are enabled in one implementation by one or more data centers 104A-104D. The data centers 104 are facilities utilized to house and operate computer systems and associated components. The data centers 104 typically include redundant and backup power, communications, cooling, and security systems. The data centers 104 might also be located in geographically disparate locations. One illustrative configuration for a data center 104 that might be utilized to implement the technologies disclosed herein is described below.

Figure 6:
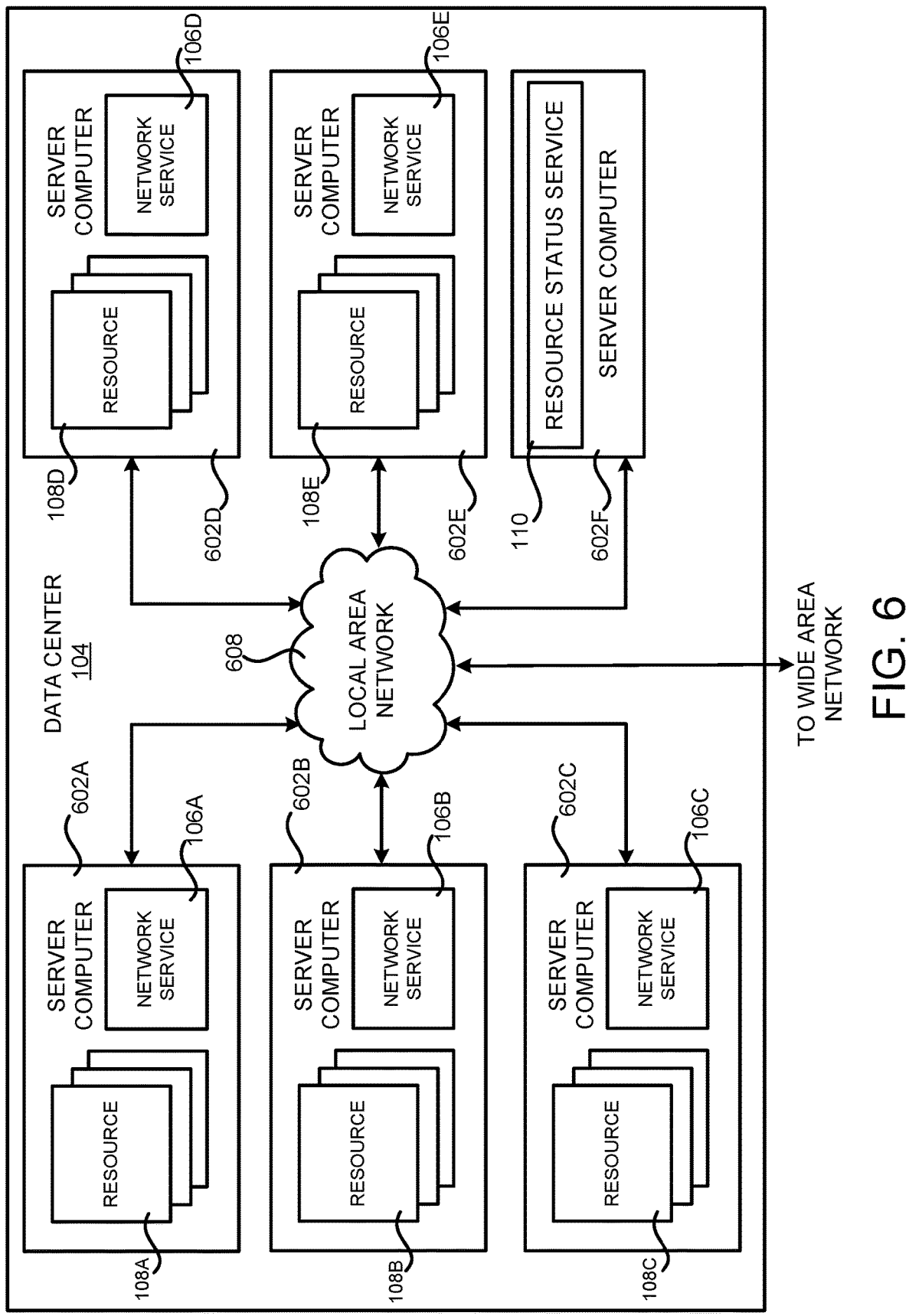
FIG. 6 is a computing system diagram illustrating a configuration for a data center that may be utilized to implement aspects of the technologies disclosed herein.

FIG. 6 is a computing system diagram that illustrates an example configuration for a data center 104 that implements aspects of the technologies disclosed herein for asynchronously providing resources status data 122. The example data center 104 shown includes several server computers 602A-602F for providing computing resources 108A-108E.

The server computers 602 may be standard tower, rack-mount, or blade server computers configured appropriately for providing the computing resources 108 (illustrated as computing resources 108A-108E). As mentioned above, the computing resources provided by the SPN 102 might be data processing resources such as VM instances or hardware computing systems, data storage resources, database resources, networking resources, and others. Some of the servers 602 might also be configured to execute network services 106A-106E, respectively, capable of instantiating, providing and/or managing the computing resources 108, some of which are described in detail below with regard to FIG. 11.

The data center 104 shown also includes a server computer 602F that may execute some or all of the software components described above. For example, and without limitation, the server computer 602F might be configured to execute the resource status service 110. The server computer 602F might also be configured to execute other components and/or to store data for providing some or all of the functionality described herein. In this regard, it should be appreciated that the resource status service 110 might execute on many other physical or virtual servers in the data centers 104 in various configurations.

In the example data center 104 shown, an appropriate LAN 608 is also utilized to interconnect the server computers 602A-602F. The LAN 608 is also connected to the network 502 illustrated in FIG. 5. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 104A-104N, between each of the server computers 602A-602F in each data center 104, and, potentially, between computing resources 108 in each of the data centers 104. It should be appreciated that the configuration of the example data center 104 is merely illustrative and that other implementations might be utilized.

Figure 7:
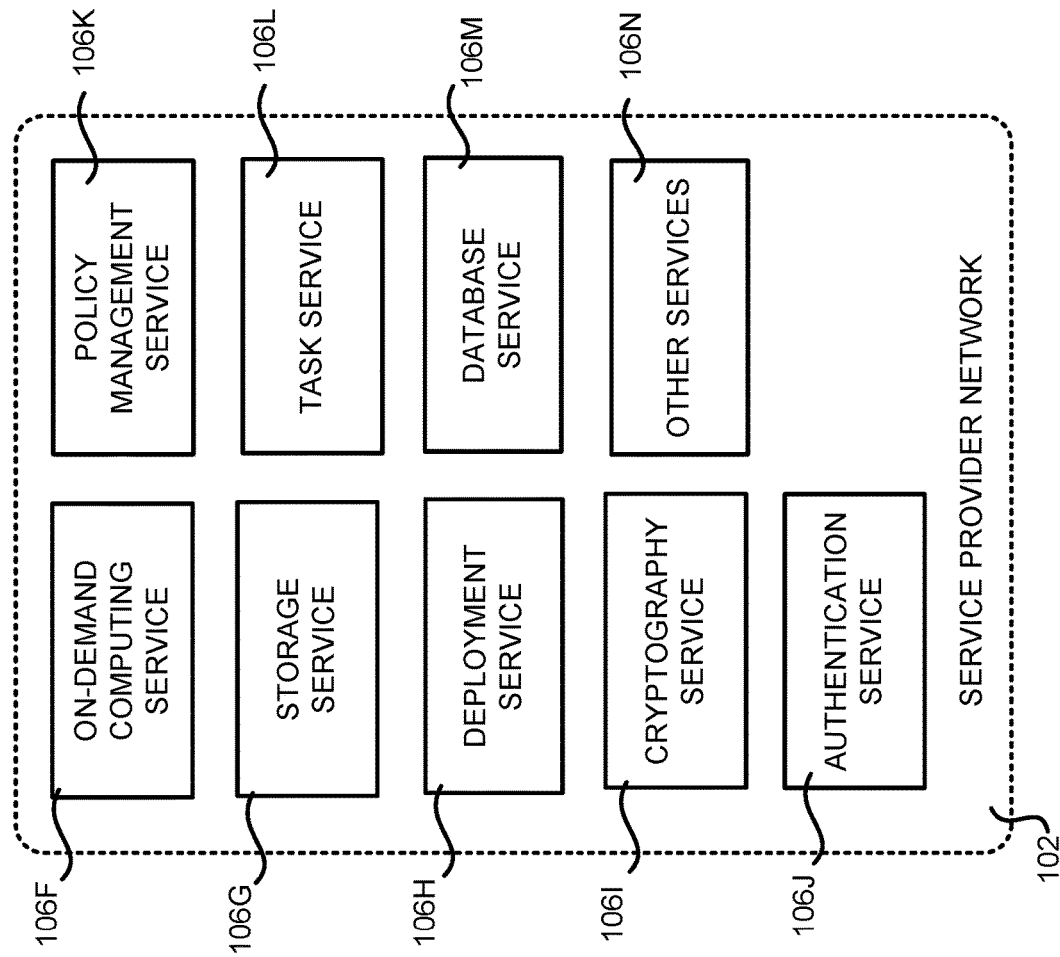
FIG. 7 is a system and network diagram that shows aspects of several network services that might be provided by and utilized within an SPN in an example configuration disclosed herein.

FIG. 7 is a system and network diagram that shows aspects of several network services 106 that might be provided by and utilized within an SPN 102 in an example configuration disclosed herein. In particular, the SPN 102 may provide a variety of network services 106 to customers and other users of the SPN 102 including, but not limited to, an on-demand computing service 106F. The SPN 102 might also provide other types of services including, but not limited to, a storage service 106G, a deployment service 106H, a cryptography service 106I, an authentication service 106J, a policy management service 106K, a task service 106L, and/or a database service 106M.

The database service 106M may be a collection of computing resources that collectively operate to create, maintain, and allow queries to be performed on databases stored within the SPN 102. For example, a customer or other user of the SPN 102 may operate and manage a database from the database service by utilizing appropriately configured network API calls. This, in turn, may allow the customer to maintain and potentially scale the operations in the database.

Additionally, the SPN 102 may additionally maintain and provide other services 106N based, at least in part, on the needs of its customers. For instance, the SPN 102 may maintain a deployment service 106H for deploying program code 106N and/or a database service 106M in some configurations. Other services provided may include object-level archival data storage services, and services that manage, monitor, interact with, or support other services. The SPN 102 might also be configured with other network services 106 not specifically mentioned herein in other configurations.

It should be appreciated that customers of the SPN 102 may include organizations or individuals that utilize some or all of the services 106 provided by the SPN 102. A customer or other user may communicate with the SPN 102 through a network, such as the network 502 shown in FIG. 5. Communications from a customer computing device, such as the customer computer 114 shown in FIG. 1, to the SPN 102 may cause the services 106 provided by the SPN 102 to operate in accordance with the described configurations or variations thereof.

It is noted that not all configurations described include the services described with reference to FIG. 7 and that additional services 106 may be provided in addition to or as an alternative to the services 106 explicitly described herein. Each of the services 106 shown in FIG. 7 might also expose web service interfaces that enable a caller to submit appropriately configured API calls to the various services through web service requests. For example, and without limitation, the services 106 might expose APIs through which the resource status service 110 can request resource status data 122 from the services 106. In addition, each of the services 106 might include service interfaces that enable the services 106 to access each other (e.g., to enable a virtual computer system provided by the on-demand computing service 106F to store data in or retrieve data from the data storage service 106G). Additional details regarding some of the services shown in FIG. 7 are provided below.

The on-demand computing service 106F may be a collection of computing resources configured to instantiate VM instances and to provide other types of computing resources 108 on demand. For example, a customer or other user of the SPN 102 may interact with the on-demand computing service 106F (via appropriately configured and authenticated API calls) to provision and operate VM instances that are instantiated on physical computing devices hosted and operated by the SPN 102. The VM instances may be used for various purposes, such as to operate as servers supporting a web site, to operate business applications or, generally, to serve as computing resources for the customer. Other applications for the VM instances may be to support database applications, electronic commerce applications, business applications and/or other applications. Although the on-demand computing service 106F is shown in FIG. 7, any other computer system or computer system service may be utilized in the SPN 102, such as a computer system or computer system service that does not employ virtualization and instead provisions computing resources on dedicated or shared computers/servers and/or other physical devices.

The storage service 106G might include software and computing resources that collectively operate to store data using block or file-level storage devices (and/or virtualizations thereof). The storage devices of the storage service 106G might, for instance, be operationally attached to virtual computer systems provided by the on-demand computing service 106F to serve as logical units (e.g., virtual drives) for the computer systems. A storage device might also enable the persistent storage of data used/generated by a corresponding virtual computer system where the virtual computer system service might only provide ephemeral data storage.

The SPN 102 may also include a cryptography service 106I. The cryptography service 106I may utilize storage services of the SPN 102, such as the storage service 106G, to store encryption keys in encrypted form, whereby the keys may be usable to decrypt customer keys accessible only to particular devices of the cryptography service 106I. The cryptography service 106I might also provide other types of functionality not specifically mentioned herein.

As illustrated in FIG. 7, the SPN 102, in various configurations, also includes an authentication service 106J and a policy management service 106K. The authentication service 106J, in one example, is a computer system (i.e., collection of computing resources 108) configured to perform operations involved in authentication of users. For instance, one of the services 106 shown in FIG. 7 may provide information from a user to the authentication service 106J to receive information in return that indicates whether or not the requests submitted by the user are authentic.

The policy management service 106K, in one example, is a network service configured to manage policies on behalf of customers or internal users of the SPN 102. The policy management service 106K may include an interface that enables customers to submit requests related to the management of policy. Such requests may, for instance, be requests to add, delete, change or otherwise modify policy for a customer, service, or system, or for other administrative actions, such as providing an inventory of existing policies and the like.

The SPN 102, in various configurations, is also configured with a task service 106L. The task service 106L is configured to receive a task package and to enable executing tasks as dictated by the task package. The task service 106L may be configured to use any resource 108 of the SPN 102, such as instantiated virtual machines or virtual hosts, for executing the task. The task service 106L may configure the instantiated virtual machines or virtual hosts to operate using a selected operating system and/or a selected execution application in accordance with specified requirements.

Figure 8:
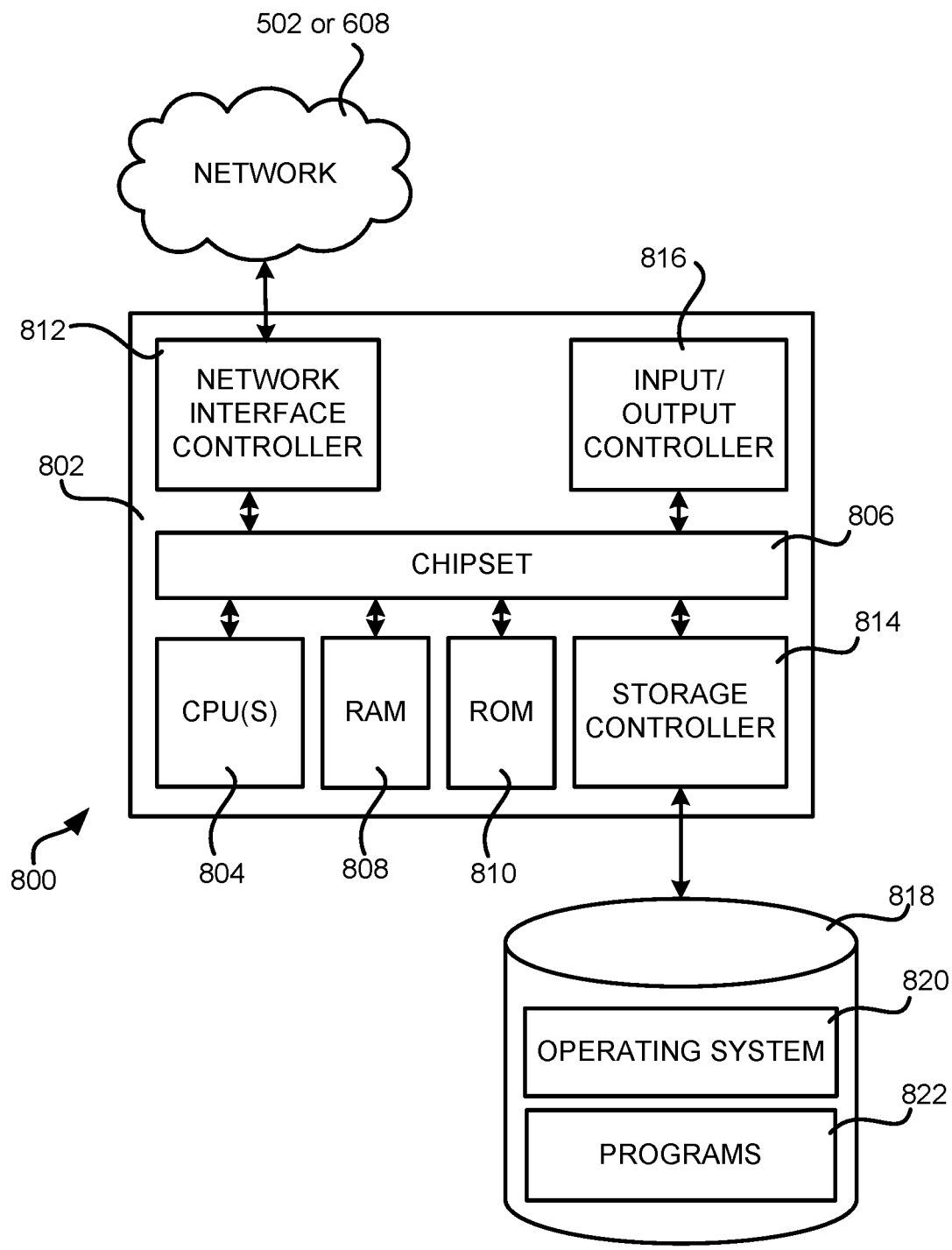
FIG. 8 shows an example computer architecture for a computer capable of executing program components for implementing the functionality described above.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and may be utilized to execute any of the software components presented herein.

The computer 800 includes a baseboard 802, or "motherboard," which is a printed circuit board to which a multitude of components or devices may be connected by way of a system bus or other electrical communication paths. In one illustrative configuration, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the configurations described herein.

The computer 800 may operate in a networked environment using logical connections to remote computing devices and computer systems through a network, such as the external network 502 or the local area network 608. The chipset 806 may include functionality for providing network connectivity through a NIC 812, such as a gigabit Ethernet adapter. The NIC 812 is capable of connecting the computer 800 to other computing devices over the networks 502, 608. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store an operating system 820, programs 822, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store information in a non-transitory fashion.

For purposes of the claims, the phrase "computer storage medium" and variations thereof, does not include waves, signals, and/or other transitory and/or intangible communication media, per se, and specifically excludes interpretations thereof which are prohibited by applicable statutory and case law.

As mentioned briefly above, the mass storage device 818 may store an operating system 820 utilized to control the operation of the computer 800. According to an example configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 818 may store other system or application programs and data utilized by the computer 800.

In an example configuration, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states. According to an example configuration, the computer 800 has access to computer-readable storage media storing computer-executable instructions which, when executed by the computer 800, perform the various processes described above. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, an input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for providing resource status data have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

It should be appreciated that the logical operations described herein with respect to the various FIGS. herein may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, such as an SPN, where tasks may be performed by remote computing devices that are linked through a communications network. In a distributed computing environment, program modules may be located in both local and remote memory storage devices.

Specific exemplary embodiments have been described herein with reference to the accompanying drawings. These embodiments are provided so that this disclosure will be thorough and complete, but variations of these embodiments, and other embodiments, may also be used to obtain the desired operation and/or results. The terminology used in the detailed description of the particular exemplary embodiments and in the accompanying drawings is not intended to be limiting or suggest that there is no other embodiment which can achieve the desired operation and/or results. Rather, the terminology is used to instruct one of ordinary skill in the art how to make and use the various embodiments described herein. The embodiments disclosed herein may be implemented as a method, system, data processing system, or computer program product. Accordingly, an entirely software embodiment, or an embodiment combining software and hardware aspects is possible and contemplated. It should be appreciated that the subject matter described herein may be implemented as a computer-controlled apparatus, a computer process, a computing system, or as an article of manufacture such as a computer-readable storage medium.

For the benefit of increasing readability, by reducing the recitation and repetition of inclusive terms, certain terms are abbreviated herein: "may be, but is not limited to," "can be, but is not limited to," "by way of example, and not of limitation," "such as, but not limited to," "for example, and not as a limitation," and similar inclusive expressions are abbreviated as "may be," "can be," "by way of example," "such as," and "for example."

The singular forms "a," "an," and "the" are intended to include the plural forms as well, unless expressly stated otherwise.

The terms "includes," "comprises," "including," "comprising," and "having" specify the presence of stated features, integers, steps, operations, elements, and/or components, but do not preclude the presence or addition of one or more other features, integers, steps, operations, elements, components, and/or groups thereof.

When an element is referred to as being "connected" or "coupled" to another element, it can be directly connected or coupled, mechanically, hydraulically, electrically, electronically, wirelessly, etc., to the other element, or intervening elements may be present.

The term "and/or" includes any and all combinations of one or more of the associated listed items.

Phrases such as "between X and Y," "between about X and Y," "between X and about Y," and "between about X and about Y," should be interpreted to include X and Y unless otherwise specifically noted.

Terms such as "about", "approximately", and "substantially" are relative terms and indicate that a value or parameter may vary from any stated value but the desired result is still achieved, that is, that the apparatus or method still provides the indicated or desired result, or that the operation of a device or method is not adversely affected to the point where it cannot perform its intended purpose. As an example, and not as a limitation, if a battery voltage of approximately "V" volts is recited, a lower battery voltage is still about, approximately, or substantially "V" volts if the connected circuit can still perform its desired function. Similarly, a higher battery voltage is still about, approximately, or substantially "V" volts if the connected circuit is not destroyed and can still perform its desired function. As another example, and not as a limitation, if a height of approximately "X" inches is recited, a lower height, or a higher height, is still about, approximately, or substantially "X" inches if the desired function can still be performed or the desired result can still be achieved.

Unless otherwise defined, all terms (including technical and scientific terms) used herein have the same meaning as commonly understood by one of ordinary skill in the art or arts relevant to this specification. It will be further understood that terms, such as those defined in commonly used dictionaries, should be interpreted as having a meaning that is consistent with their meaning in the context of this specification and relevant art, and should not be interpreted in an idealized or overly formal sense unless expressly so defined herein. For brevity and/or clarity, well-known functions or constructions may not be described in detail herein.

While the terms vertical, horizontal, upper, lower, bottom, top and the like may be used herein, it is to be understood that these terms are used for ease in referencing the drawing and, unless otherwise indicated or required by context, does not denote a required orientation when installed, mounted, assembled, used, etc.

The different advantages/benefits discussed herein may be used individually or in combination with one, some or possibly even all the other advantages/benefits. Furthermore, not every implementation, nor every component of an implementation, is necessarily required to obtain, or necessarily required to provide, an advantage or a benefit, or two or more of the advantages or benefits. Furthermore, the claimed subject matter is not limited to implementations that solve any specific disadvantage or all the disadvantages noted in any part of this disclosure.

Conditional language, such as, among others, "can", "could", "might", or "may", unless specifically stated otherwise, or otherwise understood within the context as used, is generally intended to convey that certain embodiments preferably or optionally include certain features, elements and/or steps, while some other embodiments optionally may not include those certain features, elements and/or steps. Thus, such conditional language indicates, in general, that those features, elements and/or steps may not be required for every implementation or embodiment.

Language specific to mechanical, electrical, operational, and computer structural features, methodological and transformative acts, specific computing machinery, and computer-readable storage media may have been used herein, but the appended claims are not necessarily limited to the specific features, hardware, acts, operations, or media described herein. Rather, the specific features, acts, and mediums are disclosed as example forms of implementing the claims.

The subject matter described herein is provided by way of illustration for the purposes of teaching, suggesting, and describing only, and should not be construed as limiting or restricting the scope of the claims. Furthermore, the claimed subject matter is not limited to implementations that solve any or all disadvantages noted in any part of this disclosure. Combinations and alternatives to the illustrated embodiments are contemplated and described herein, and may be set forth in the claims. Various modifications and changes may be made to the subject matter described herein without strictly following the example configurations and applications illustrated and described, and without departing from the true spirit and scope of the present invention, which is set forth in the following claims.

What is claimed is:

1. A computer-implemented method comprising:
   determining a communication channel between a service provider network and a remote device;
   receiving, at the service provider network and from the remote device, a request for status data associated with a computing resource of the service provider network;
   obtaining, at the service provider network, a first portion of the status data associated with the computing resource;
   determining, at the service provider network, that a period of time in which the first portion of the status data is obtained is greater than a threshold period of time;
   based at least in part on the period of time being greater than the threshold period of time, sending a response to the remote device, including the first portion of the status data, and indicating an estimated time that a second portion of the status data will be sent asynchronously, wherein sending the second portion of the status data asynchronously comprises sending the second portion of the status data after the period of time, and wherein the estimated time is determined based at least in part on at least one of a current volume of requests received by the service provider network or a subscription limit associated with the remote device;

closing, after the sending of the response, the communication channel;

determining that the service provider network is unable to send the second portion of the status data prior to the estimated time;

sending, to the remote device, prior to an expiration of the estimated time, and based at least in part on the service provider network being unable to send the second portion of the status data prior to the estimated time, an updated estimate time;

obtaining, at the service provider network, the second portion of the status data associated with the computing resource; and subsequent to the period of time, and subsequent to the closing the communication channel, sending, to the remote device and from the service provider network, the second portion of the status data.

2. The computer-implemented method of claim 1 and further comprising:

determining the estimated time to provide the status data.

3. The computer-implemented method of claim 1 wherein the request for status data comprises a function call, the function call comprises an identification number, and sending the response to the remote device comprises sending the identification number.

4. The computer-implemented method of claim 1 wherein the request for status data comprises a function call, the function call comprising an identification number, and wherein sending the second portion of the status data to the remote device further comprises sending the identification number.

5. The computer-implemented method of claim 1, wherein the request for status data includes a reference to a program, the method further comprising executing the program to obtain the status data associated with the computing resource.

6. The computer-implemented method of claim 1, wherein the request for status data comprises a request to obtain at least one of:

an indication of whether the computing resource is available for use;

a second estimated time before the computing resource is available for use; or a current usage rate of the computing resource.

7. An apparatus comprising:

a processor; and a computer-readable storage medium having instructions stored thereupon which are executable by the processor and which, when executed by the processor, cause the apparatus to:

receive, from a remote device, data indicating a request for status data associated with a computing resource in a service provider network;

obtain a first portion of the status data associated with the computing resource and store the first portion of the status data in a cache;

obtain, after obtaining the first portion of the status data, a second portion of the status data and store the second portion of the status data in the cache;

determine that the first portion of the status data and the second portion of the status data are obtained in less than a threshold period of time;

determine at least one of a customer rating or a customer urgency rating associated with the remote device; and based at least in part on the at least one of the customer rating or the customer urgency rating, and based at least in part on the first portion of the status data and the second portion of the status data being obtained in less than the threshold period of time:

determine to send a synchronous response to the remote device, wherein sending the synchronous response comprises sending the first portion of the status data and the second portion of the status data prior to an end of the threshold period of time; and send the synchronous response to the remote device, the synchronous response comprising the first portion of the status data and the second portion of the status data.

8. The apparatus of claim 7 wherein the instructions, when executed by the processor, further cause the apparatus to push a third portion of the status data to a queue, the queue being external to the apparatus, wherein the third portion of the status data is received after the end of the threshold period of time.

9. The apparatus of claim 8 wherein the instructions, when executed by the processor, further cause the apparatus to push the third portion of the status data to the queue by use of a Simple Queue Service command.

10. The apparatus of claim 7 wherein the instructions, when executed by the processor, further cause the apparatus to assign an identification number to the request for status data, wherein the synchronous response to the remote device comprises the identification number.

11. The apparatus of claim 7 wherein the request for status data comprises a function call, and wherein the instructions, when executed by the processor, further cause the apparatus to:

provide an estimated time for obtaining the status data; and determine the estimated time for obtaining the status data based on at least one of:

an average time to obtain status data for a requestor of the function call, a recent or rolling average time to obtain status data for a requestor of the function call, an average time to obtain status data from the computing resource, a recent or rolling average time to obtain status data from the computing resource, an average time for obtaining status data from a group of computing resources, a recent or rolling average time to obtain status data from a group of computing resources, an average time to obtain status data wherein the function call includes a particular parameter, a recent or rolling average time to obtain status data wherein the function call includes a particular group of parameters, an average time to obtain status data from one or more computing resources at a geolocation, a recent or rolling average time to obtain status data from computing resources at a group of geolocations, an average time to obtain status data from an external computing resource, a recent or rolling average time to obtain status data from a group of external computing resources; and/or a volume of function calls.

12. The apparatus of claim 7, wherein the instructions, when executed by the processor, further cause the apparatus to:

obtain, during a period of time subsequent to the threshold period of time, a third portion of the status data associated with the computing resource;

determine that the period of time in which the third portion of the status data is obtained is subsequent to the threshold period of time; and based at least in part on the period of time being subsequent to the threshold period of time, send an asynchronous response to the remote device, the asynchronous response comprising the third portion of the status data.

13. The apparatus of claim 7, wherein the computing resource comprises a first computing resource, and wherein the request for status data comprises a request to obtain at least one of:

an indication of a second computing resource of the service provider network that is available for use;

a second estimated time before the second computing resource is available for use; or a current usage rate of the first computing resource.

14. The apparatus of claim 7, wherein the synchronous response is a first synchronous response, comprising further computer-executable instructions that, when executed, cause the processor to:

obtain a third portion of the status data associated with the computing resource and store the third portion of the status data in the cache;

determine that the third portion of the status data was obtained in less than the threshold period of time; and send, prior to the sending of the first synchronous response to the remote device, a second synchronous response to the remote device, the second synchronous response comprising the third portion of the status data.

15. A system comprising:

one or more processors; and one or more computer-readable media storing computer-executable instructions that, when executed, cause the one or more processors to:

determine a communication channel with a remote device;

receive, from the remote device, a request to obtain status data associated with a computing resource of a service provider network;

determine to provide the status data asynchronously;

send, to the remote device, a response including a first portion of the status data and indicating an estimated time that a second portion of the status data is to be sent asynchronously, wherein sending the second portion of the status data asynchronously comprises sending the second portion of the status data after a period of time, and wherein the estimated time is determined based at least in part on at least one of a current volume of requests received by the service provider network or a subscription limit associated with the remote device;

closing, after sending the response, the communication channel; and sending, subsequent to the closing of the communication channel, the second portion of the status data asynchronously to the remote device such that the second portion of the status data is sent to the remote device subsequent to the period of time.

16. The system of claim 15, comprising further computer-executable instructions that, when executed, cause the one or more processors to determine the period of time based at least in part on at least one of an average time or a rolling average time to obtain historical status data from the computing resource.

17. The system of claim 15, comprising further computer-executable instructions that, when executed, cause the one or more processors to:

obtain the second portion of the status data; and push the second portion of the status data to a queue of the service provider network, wherein the queue sends the second portion of the status data to the remote device.

18. The system of claim 15, comprising further computer-executable instructions that, when executed, cause the one or more processors to:

push the first portion of the status data to a queue of the service provider network, wherein the queue sends the first portion of the status data to the remote device.

19. The system of claim 15, wherein the computing resource comprises a first computing resource, and wherein the request to obtain status data comprises a request to obtain at least one of:

an indication of a second computing resource of the service provider network that is available for use;

a second estimated time before the second computing resource is available for use; or a current usage rate of the first computing resource.

20. The system of claim 15, comprising further computer-executable instructions that, when executed, cause the one or more processors to execute, based at least in part on the request for status data associated with the computing resource, a program to obtain the status data associated with the computing resource.

* * * * *